United States Patent
Chou (12) 
(10) Patent No.: US 6,593,909 B1
(45) Date of Patent: Jul. 15, 2003

(54) DIRECTION-CONTROL SWITCH MODULE FOR CONTROLLING A SCREEN CURSOR

(75) Inventor: Chin-Wen Chou, Taipei (TW)

(73) Assignee: Shin Jiuh Corp., Taipei Hsien (TW)

( * ) Notice: Subject to any disclaimer, the term of this patent is extended or adjusted under 35 U.S.C. 154(b) by 253 days.

(21) Appl. No.: 09/606,198

(22) Filed: Jun. 29, 2000

(51) Int. Cl.⁷ ................................................ G09G 5/08
(52) U.S. Cl. ........................................ 345/157; 200/6 A
(58) Field of Search ................................ 345/156–172; 200/5 A, 5 B, 5 C, 5 D, 5 E, 6 A (56) References Cited

U.S. PATENT DOCUMENTS 6,080,941 A * 6/2000 Yokobori .................... 200/6 A
6,162,999 A * 12/2000 Ishikawa et al. ............ 200/6 A
6,313,731 B1 * 11/2001 Vance ........................ 338/185

* cited by examiner

Primary Examiner—Steven Saras
Assistant Examiner—Amr Awad
(74) Attorney, Agent, or Firm—Birch, Stewart, Kolasch & Birch, LLP (57) ABSTRACT

A direction-control switch module. The module includes a cross-channel disposed in an inner wall of an upper cover and an opposite base respectively, as well as a control set disposed between the upper cover and the base. A common pin and plurality connecting pins extend to the hub or terminals of the cross-channel in the base. An actuation portion includes a center hole being protrusively disposed in the upper cover in an axial line defined by the center of the upper cover and the base. The control set further includes a pushbutton having an axial hole and a spherical portion, a shaft, and resilient members. When force is applied to the shaft to enable the spherical portion in the actuation portion to displace in a specified direction, this enables a depression piece extended from the spherical portion to move downward to depress and contact a connecting pin for output of a distinct direction signal to control displacement of a screen cursor.

6 Claims, 8 Drawing Sheets

DIRECTION-CONTROL SWITCH MODULE FOR CONTROLLING A SCREEN CURSOR

BACKGROUND OF THE INVENTION

This invention relates to direction-control switch modules, more particularly, it relates to a direction-control switch module of which a single module can be applied in a cellular phone set or a computer system for space saving.

Following to the highly developed science technology, the electronic products are made more and more rich in diversity and complexity to provide various delicate service that was unimaginable some ten years ago, particularly, after debut of the INTERNET, information exchange becomes as easy and fast as turning the palm upside down.

Recently, most communication products, such as wireless cellular phone sets or generic traditional phone sets, are equipped with a screen for a user to select function items (web link, revision, data registry, phone number inquiry, automatic dial, etc). However, the existing separated DIRECTION keys and ENTER key occupy a great space in proportion to a small size electronic product with relatively complicated operation, and the defects may be summarized below:

1. As the DIRECTION keys and ENTER key are separately located on an electronic product, it is rather inconvenient for a user to operate. Moreover, the assembly mode is different from a brand to another, design cost is wasted repeatedly.
2. As the DIRECTION keys are separately and independently disposed, at least four switches would be required that conflicts with the trend of volume-minimization.

SUMMARY OF THE INVENTION

The primary object of this invention is to provide a direction-control switch module for eliminating abovesaid defects and for space saving by using a single module of which in a cellular phone set, computer system, etc.

In order to realize said object, the direction-control switch module comprises: a cross-channel disposed in an inner wall of an upper cover and an opposite base respectively, as well as a control set disposed between the upper cover and the base; a common pin and a plurality of connecting pins being extended to the hub or terminals of the cross-channel in the base; an actuation portion having a center hole being protrusively disposed in the upper cover in an axial line defined by center of the upper cover and the base; the control set further comprising a pushbutton having an axial hole and a spherical portion, a shaft, and a plurality of resilient members. When force is applied to the shaft to enable the spherical portion in the actuation portion to displace in a specified direction, and enable a depression piece extended from the spherical portion to move downward to depress and contact a connecting pin for output of a distinct direction signal to thereby control displacement of a screen cursor.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
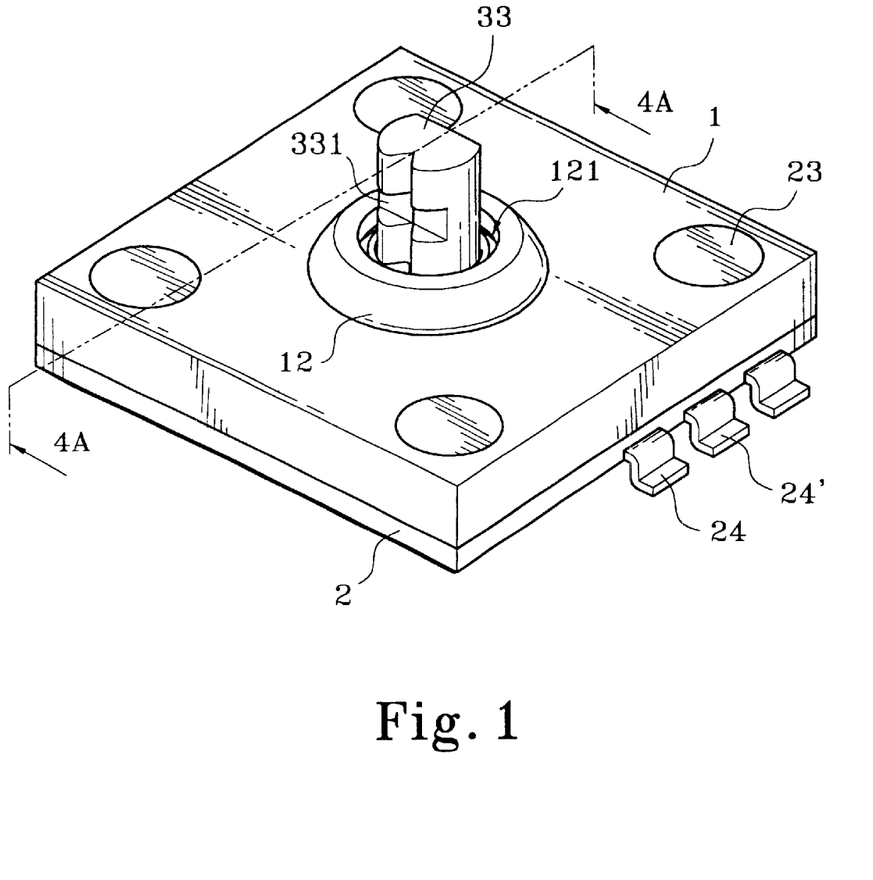
FIG. 1 is an elevational view of this invention in three dimensions.
Figure 2:
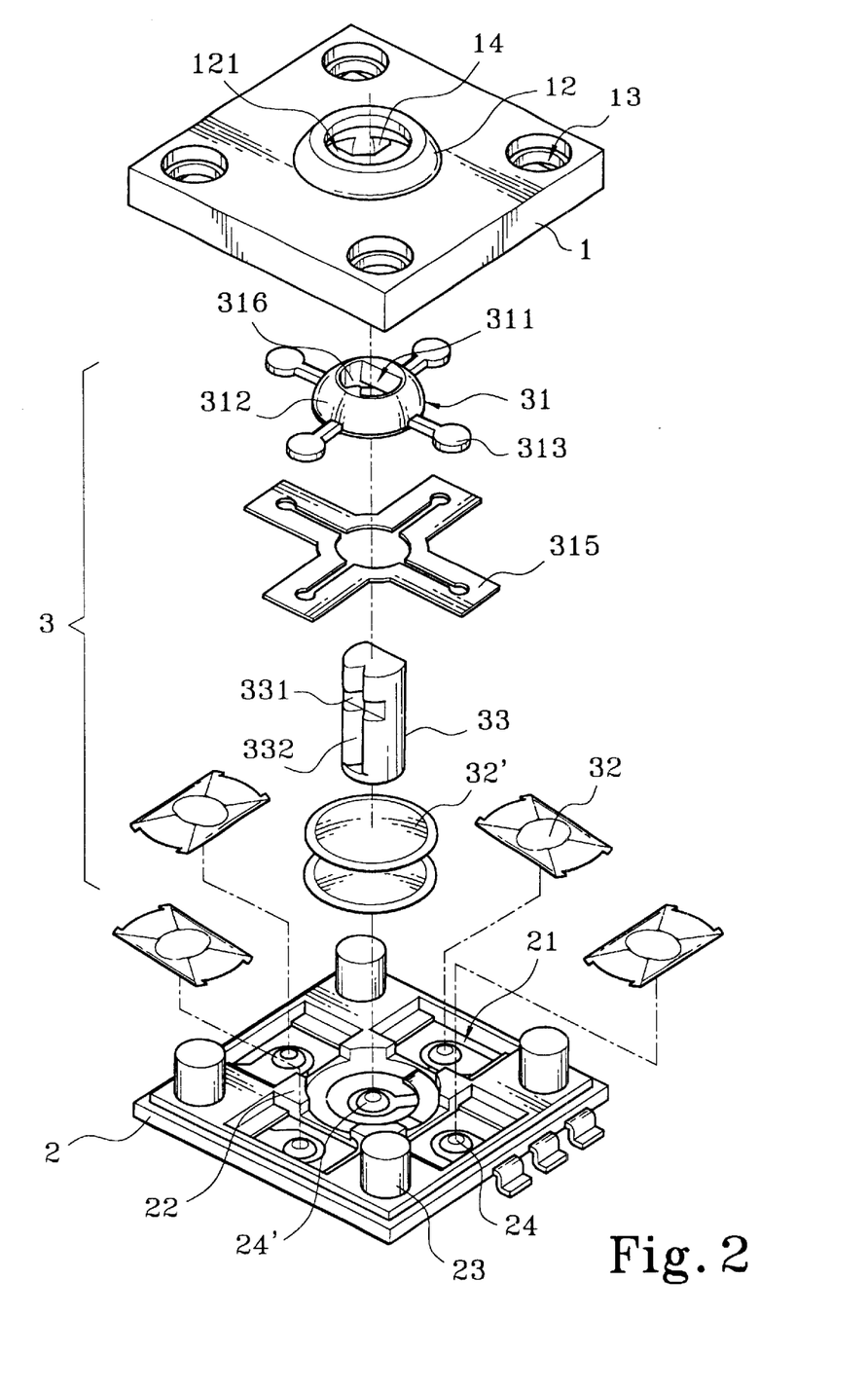
FIGS. 2, 3 illustrate exploded structural views of this invention.
Figure 3:
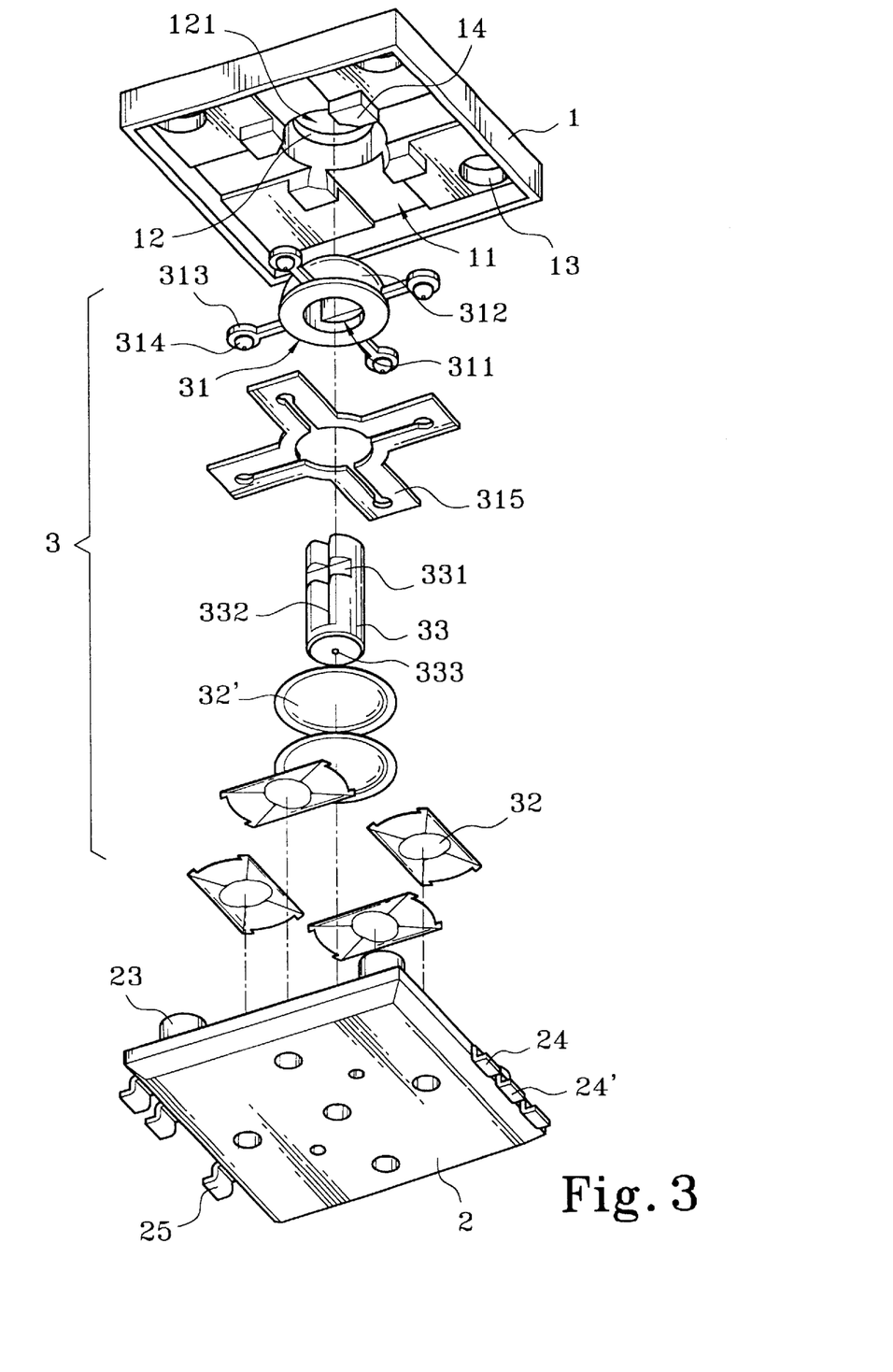

As shown in FIGS. 1, 2, 3, a direction-control switch module of this invention comprising an upper cover 1, a base 2, and a control set 3 disposed between the upper cover 1 and the base 2 can be fitted in a keyboard or a keypad of mobile phone set, telephone set, personal computer, notebook computer, card reader, etc, for control motion of the screen cursor.

In the upper cover 1 and the base 2, a cross-channel 11, 21 is formed in opposite respective inner walls, wherein a common pin 25 and a plurality of connecting pins 24, 24' are extended to the hub or terminals of the cross-channel 21 in the base 2; an actuation portion 12 having a spherically surfaced inner wall and a center hole 121 is protrusively disposed in the upper cover 1 in an axial line defined by center of the upper cover 1 and the base 2; and a plurality of positioning posts 23 or matchable positioning holes 13 is distributed to comers apiece in the base 2 and the upper cover 1 respectively so that the positioning post 23 will be retained in the positioning hole 13, which is substantially a receptacle, when the upper cover 1 is closed.

The control set 3 comprises: a pushbutton 31 with an axial hole 311 located in the axial line being arranged between the upper cover 1 and the base 2; a shaft 33 penetrating the axial hole 311 in the axial line and exposing over the center hole 121; a plurality of convex resilient members 32, 32' located between the pushbutton 31 and the common pin 25 and between the pushbutton 31 and the plurality of connecting pins 24, 24'; a spherical portion 312 capable of displacing along the spherically surfaced inner wall of the actuation portion 12 being formed in surface of the pushbutton 31; and the circumference of the spherical portion 312 being extended outwardly to form a plurality of depression pieces 313 with respective protruding portions 314, wherein a reinforcement piece 315 made in metal is jointedly provided to the depression pieces 313 for hardness enhancement so as to strengthen the latter against being ruptured.

Figure 4A:
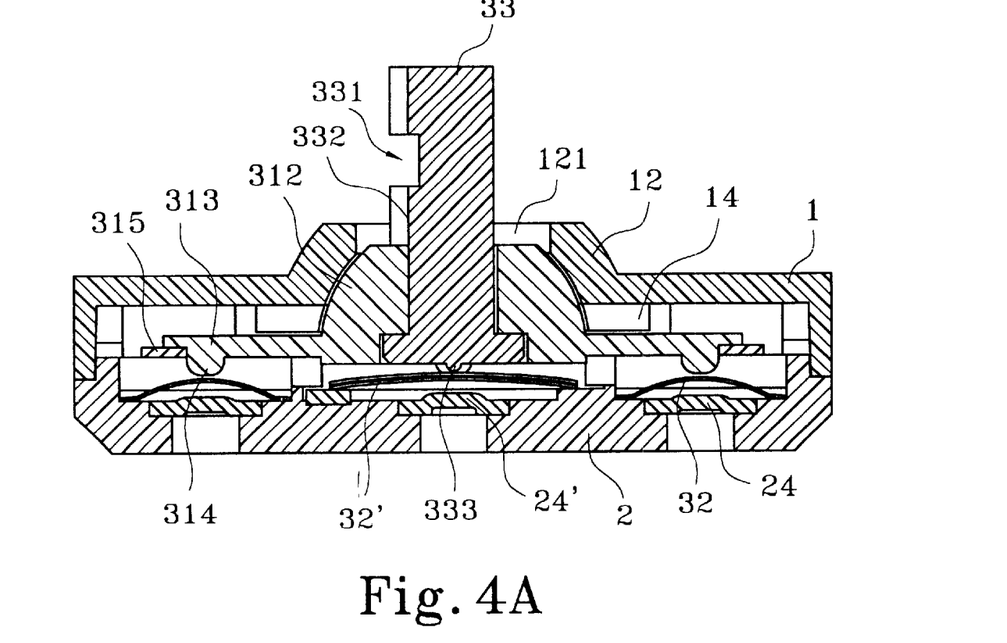
FIGS. 4A, 4B, 4C show cutaway sectional views in different assembled action states taken along line 4A—4A of FIG. 1.
Figure 4B:
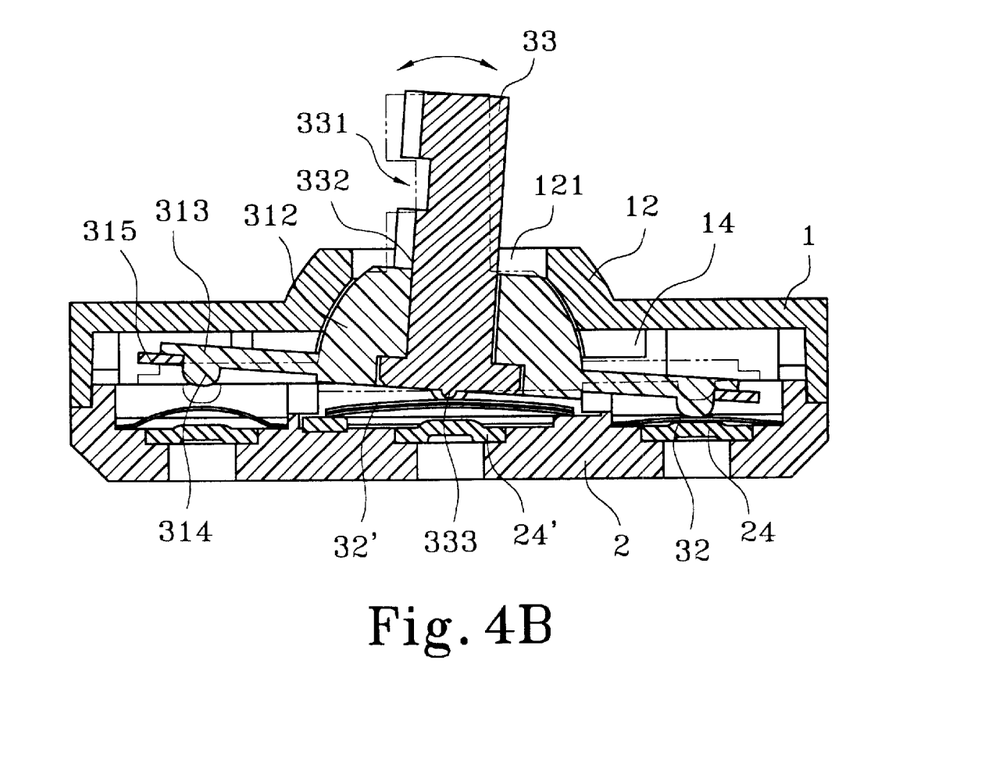
Figure 4C:
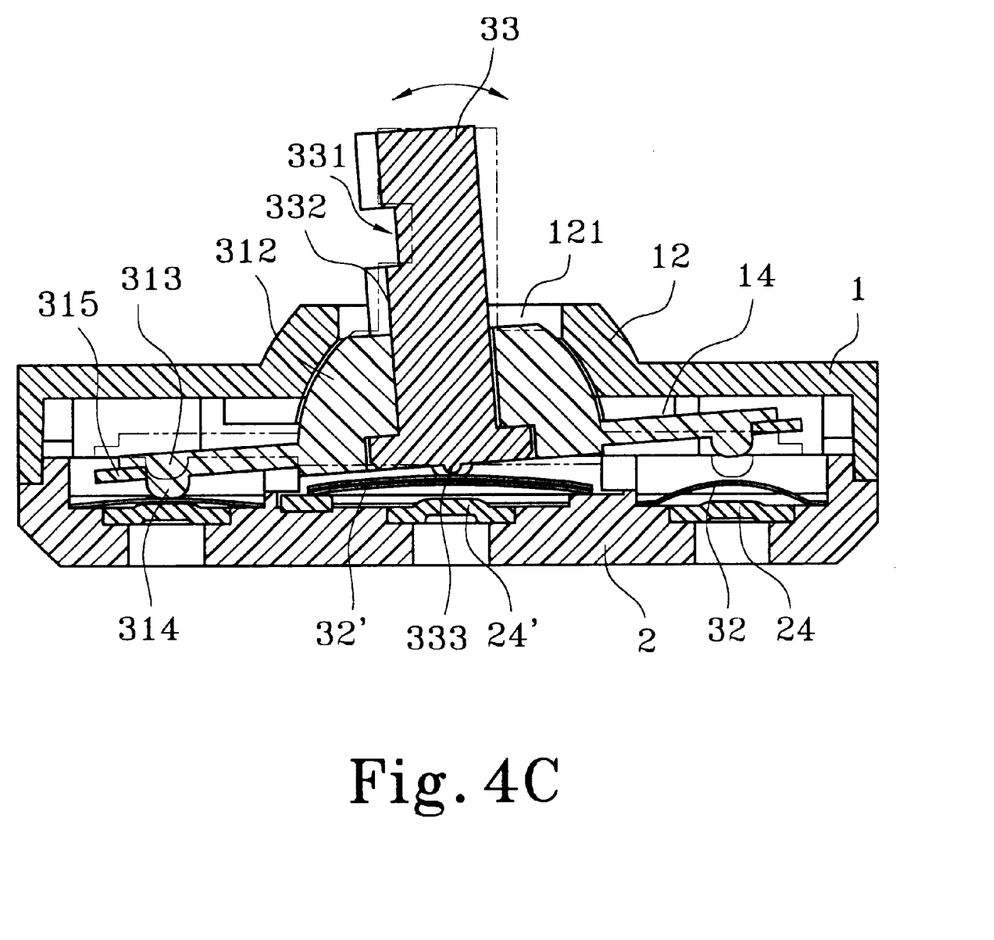
Figure 7:
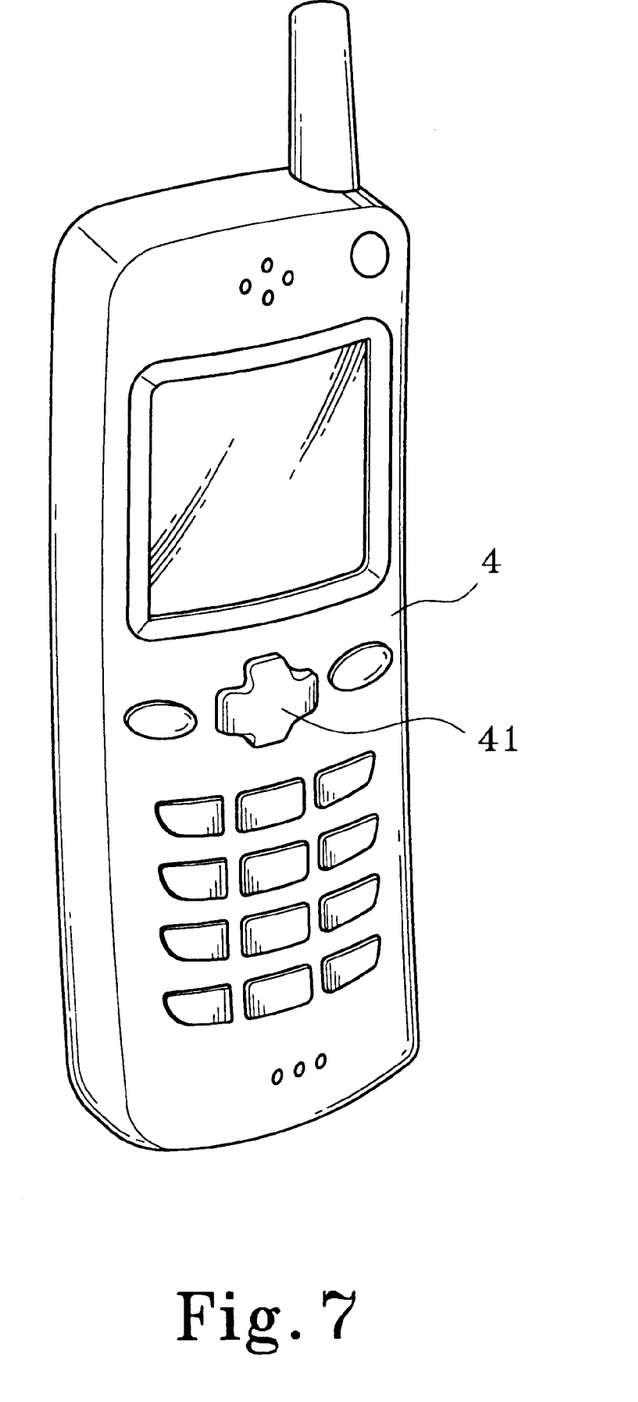
FIG. 7 is a schematic view of an embodiment of this invention.

Referring to FIGS. 4A, 4B, the direction-control switch module of this invention can be fitted in a cellular phone set 4 shown in FIG. 7 by taking advantage of a joint-to-assemble groove 331 in the shaft 33 for serving as a direction-control key 41. When moving a screen cursor to a specified position is desired, a user is supposed to apply force onto a direction key of the direction-control key 41 so as to drive the interactive shaft 33 to displace slightly in the same direction in the relatively larger center hole 121. At this moment, the pushbutton 31 in the actuation portion 12 is driven by the shaft 33 to displace in a predetermined execution direction by taking advantage of the spherical portion 312 of the pushbutton 31 and the spherical surfaced inner wall of the actuation portion 12. On the other hand, a projecting portion 316 or a matchable guide channel 332 is formed in the pushbutton 31 or the shaft 33 respectively together with a supporting portion 14, 22 disposed adjacent to the axial line of the upper cover 1 and the base 2 respectively for supporting positioning of the spherical portion 312 and for controlling displacement direction of the depression pieces 313 to ensure a reliable displacement of the spherical portion 312 and the depression pieces 313. Meanwhile, the depression pieces 313 and the reinforcement piece 315 will move downward after displacement of the spherical portion 312 so that the protruding portions 314 can depress the resilient member 32 to enable the convex central portion of the latter to in turn depress and contact the connecting pin 24. Thus, the screen cursor can be moved to a specified position according to an output direction signal. (FIG. 4C is a schematic view showing operation of moving the screen cursor to another direction.)

Figure 5:
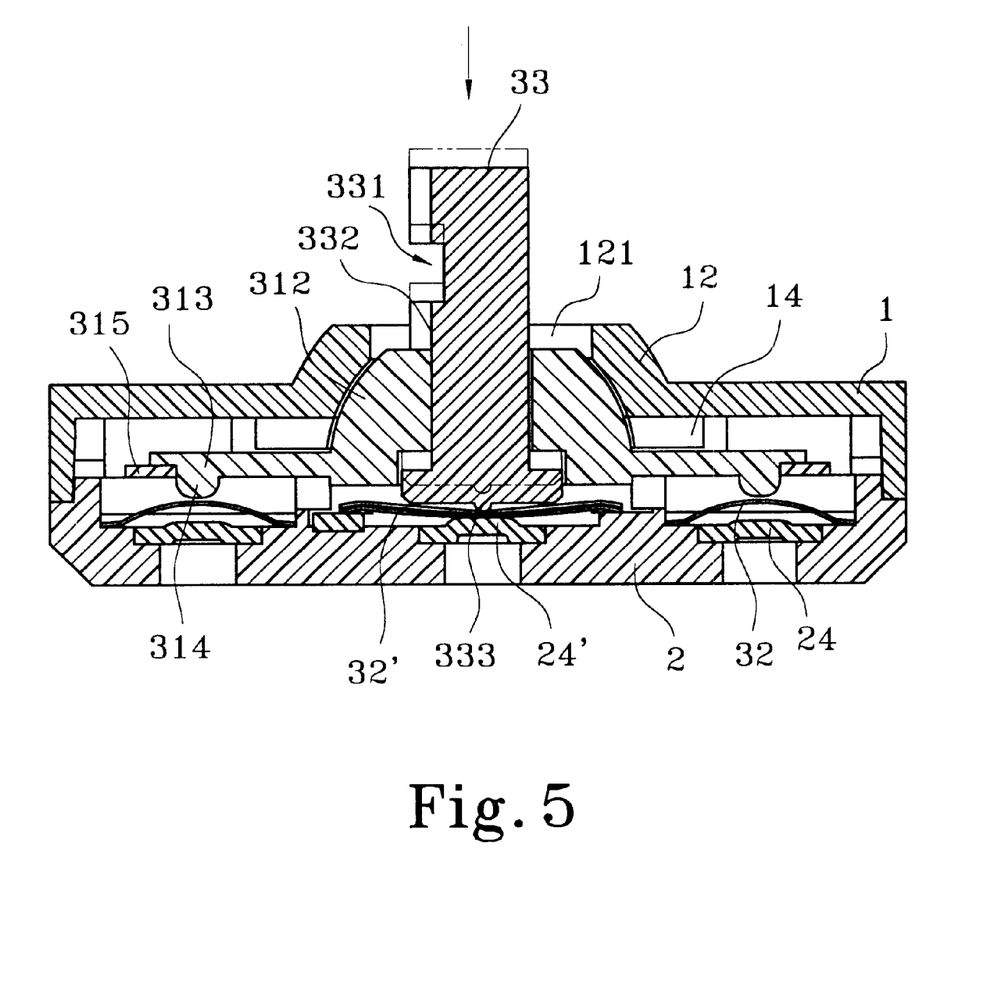
FIG. 5 shows another assembled action state of this invention.
Figure 6:
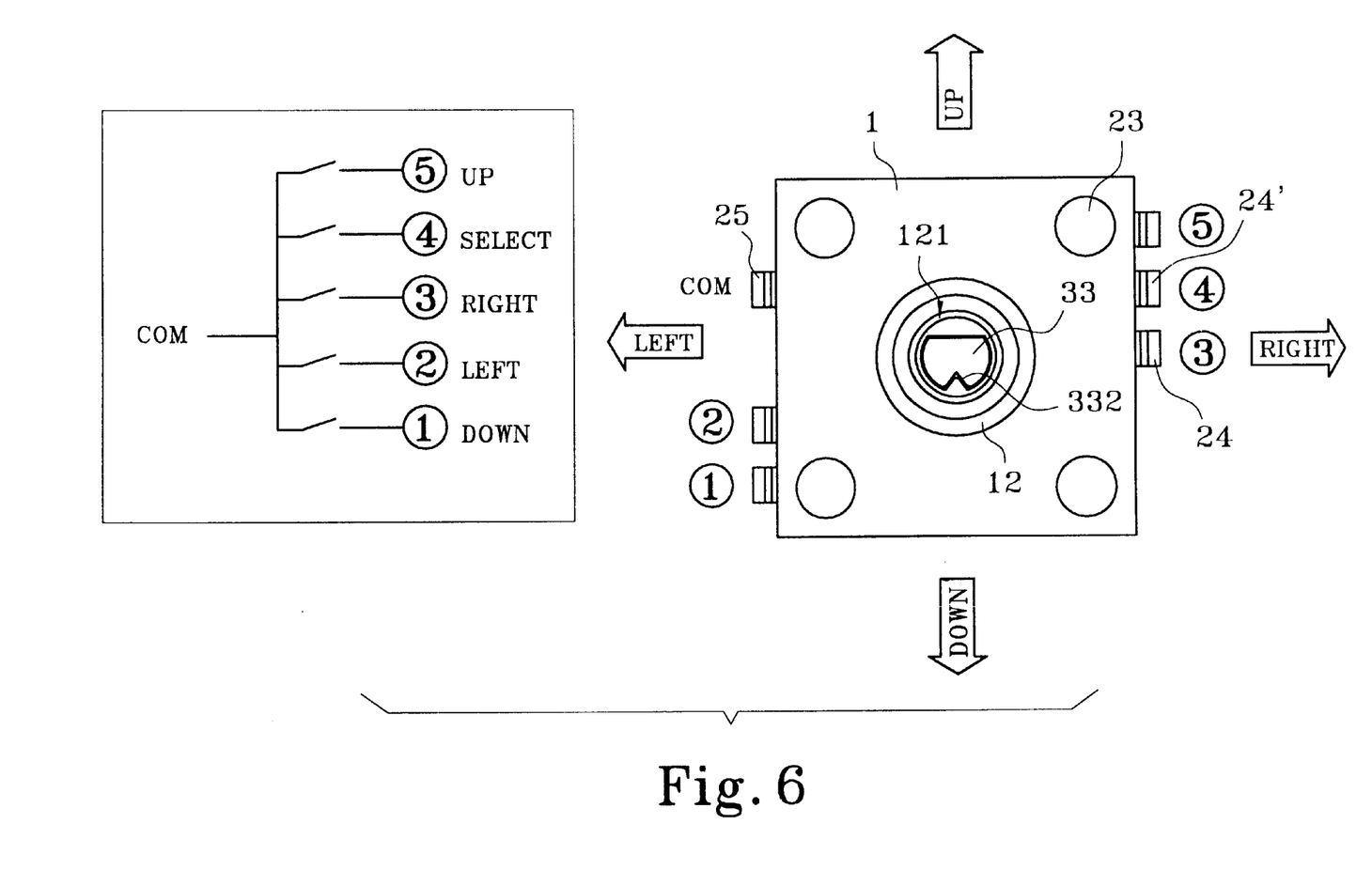
FIG. 6 is a schematic view showing an connection embodiment of a common pin and a plurality of connecting pins of this invention.

Then, as illustrated in FIG. 5, the user is requested to depress the direction-control key 41 on its central portion and thereby the shaft 33 is forced to move downward to in turn depress the resilient member 32' to contact the connecting pin 24' for output of a running signal (or selection signal) by taking advantage of a protruding portion 333 located at the bottom end of the shaft 33, which depresses the central portion of the resilient member 32' to contact the connecting pin 24' of the base 2 in the defined axial line. And, after the screen cursor is displaced and when a command is ended, the squeezed convex central portion of the resilient members 32, 32' will restore to prop and reset the protruding portions 333, 314 of the shaft 33 and the pushbutton 31 back to their initial states. From FIG. 6, it is understood that the common pin 25 and the connecting pins 24, 24' are implemented for creation of a running signal and a variety of direction signals respectively, and basing on the above described, a direction-control switch module of this invention is completed for output of distinct running or direction signals.

Although, this invention has been described in terms of preferred embodiments, it is apparent that numerous variations and modifications may be made without departing from the true spirit and scope thereof, as set forth in the claims below.

What is claimed is:

1. A direction-control switch module adapted to be applied in electronic products for control of displacement of a screen cursor, the switch module comprising:

an upper cover and a base, wherein a cross-channel is formed in an inner wall of the upper cover and the base respectively and oppositely;

a hub and a plurality of terminals of the cross-channel in the base are connected with a common pin or connecting pins;

an actuation portion with a center hole is disposed in the upper cover and in an axial line defined by centers of the upper cover and the base;

a control set comprising a pushbutton having an axial hole located in the axial line being disposed between the upper cover and the base;

a shaft located in the axial line penetrating the axial hole of the pushbutton and extending through the center hole;

a plurality of resilient members disposed between the pushbutton and the common pin and between the pushbutton and the connecting pins;

a spherical portion formed on the pushbutton for operation in the actuation portion; and a plurality of depression pieces each having a protruding portion individually being formed at positions corresponding to the terminals of the cross-channel by extending the circumference of the spherical portion outwardly, for output of a distinct direction signal by applying force onto the shaft to enable the spherical portion to act in any specified direction in the actuation portion, and to depress one of the depression pieces downwards to have the protruding portion in turn depressed against a resilient member for contact with one of the connecting pins or the common pin to thereby move a screen cursor to a specified position and provide a direction-control switch module, and a reinforcement piece detachable from the pushbutton adapted to reinforce the depression pieces and located immediately below the pushbutton, for enhancing rigidity.

2. The direction-control switch module according to claim 1, wherein corners in the upper cover and the base are provided with a positioning hole or a matchable positioning post apiece.

3. The direction-control switch module according to claim 1, wherein a supporting portion is disposed adjacent to the axial line of the upper cover and the base respectively for supporting positioning of the spherical portion and for controlling displacement direction of the depression pieces.

4. The direction-control switch module according to claim 1, wherein the resilient members are substantially spherical convex pieces.

5. The direction-control switch module according to claim 1, wherein a projecting portion or a matchable guide channel is formed in the pushbutton or the shaft.

6. The direction-control switch module according to claim 1, wherein a joint-to-assemble groove is formed in the shaft.

* * * * *